(12) United States Patent
Hosoi et al.

(10) Patent No.: US 12,034,565 B2
(45) Date of Patent: Jul. 9, 2024

(54) VEHICLE CONTROL SYSTEM AND CIRCUIT DEVICE

(71) Applicant: DENSO CORPORATION, Kariya (JP)

(72) Inventors: Yudai Hosoi, Kariya (JP); Yusuke Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/899,105

(22) Filed: Aug. 30, 2022

(65) Prior Publication Data

US 2023/0069232 A1    Mar. 2, 2023

(30) Foreign Application Priority Data

Sep. 2, 2021   (JP) ................. 2021-143380

(51) Int. Cl.
    *H04L 12/40*    (2006.01)
(52) U.S. Cl.
    CPC .......... *H04L 12/40006* (2013.01); *H04L 2012/40215* (2013.01); *H04L 2012/40273* (2013.01)
(58) Field of Classification Search
    CPC ..... H04L 12/40006; H04L 2012/40215; H04L 2012/40273
    See application file for complete search history.

(56) References Cited

U.S. PATENT DOCUMENTS

| | | | | |
|---|---|---|---|---|
| 8,645,452 | B2* | 2/2014 | Takashima | ........ H04L 12/40006 701/32.7 |
| 9,880,956 | B2* | 1/2018 | Hartwich | .............. G06F 13/362 |
| 10,489,069 | B2* | 11/2019 | Carlough | ................ G06F 3/065 |
| 2005/0254518 | A1 | 11/2005 | Fujimori | |
| 2016/0355198 | A1* | 12/2016 | Dulmage | ................ B61L 27/70 |
| 2019/0132424 | A1* | 5/2019 | Jeong | ...................... H04L 69/18 |
| 2019/0308647 | A1* | 10/2019 | Dulmage | .............. B61L 25/028 |
| 2020/0331494 | A1* | 10/2020 | Ando | ................ B60W 50/0098 |
| 2021/0067930 | A1* | 3/2021 | Yokota | .................... H04L 12/40 |
| 2023/0306796 | A1* | 9/2023 | Tsuchiya | ................ G07C 5/008 701/31.4 |

* cited by examiner

*Primary Examiner* — Henry Tsai
*Assistant Examiner* — Christopher A Daley
(74) *Attorney, Agent, or Firm* — Posz Law Group, PLC

(57) ABSTRACT

A vehicle control system is communicably connected with an electronic controller and a control circuit. The control circuit is controlled by the electronic controller as a control target. The vehicle control system communicates with the electronic controller using a control communication frame and communicates with the control circuit using a circuit communication frame. The control communication frame and the circuit communication frame have different formats from one another. The vehicle control system includes at least one of a first sequence circuit converting the control communication frame into the circuit communication frame or a second sequence circuit converting the circuit communication frame into the control communication frame.

10 Claims, 20 Drawing Sheets

FIG. 2

1REG61

| FIRST BYTE | SECOND BYTE | THIRD BYTE | FOURTH BYTE | FIFTH BYTE | SIXTH BYTE | SEVEN BYTE | EIGHTH BYTE |
|---|---|---|---|---|---|---|---|
| IDENTIFICATION ID | BIT NUMBER OF SPI ADDRESS | STARTING BIT POSITION OF SPI ADDRESS | BIT NUMBER OF SPI DATA | STARTING BIT POSITION OF SPI DATA | INFORMATION OF OTHER SPI DATA | STARTING POSITION OF SPI ADDRESS PORTION OF CAN DATA | STARTING POSITION OF SPI DATA PORTION OF CAN DATA |

FIG. 3

2REG62

| FIRST BYTE | SECOND BYTE | THIRD BYTE | FOURTH BYTE | FIFTH BYTE | SIXTH BYTE | SEVEN BYTE | EIGHTH BYTE |
|---|---|---|---|---|---|---|---|
| IDENTIFICATION ID | CAN ID | BIT NUMBER OF SPI ADDRESS | STARTING BIT POSITION OF SPI ADDRESS | BIT NUMBER OF SPI DATA | STARTING BIT POSITION OF SPI DATA | STARTING POSITION FOR STORING OF SPI ADDRESS PORTION OF CAN DATA | STARTING POSITION FOR STORING OF SPI DATA PORTION OF CAN DATA |

FIG. 14

| 5REG65 | | | | | | |
|---|---|---|---|---|---|---|
| FIRST BYTE | SECOND BYTE | THIRD BYTE | FOURTH BYTE | FIFTH BYTE | SIXTH BYTE | SEVEN BYTE |
| IDENTIFICATION ID | ADDRESS FOR 1SPIREG | ADDRESS FOR 2SPIREG | ADDRESS FOR 3SPIREG | SUPPLEMENT DATA FOR 1SPIREG | SUPPLEMENT DATA FOR 2SPIREG | SUPPLEMENT DATA FOR 3SPIREG |

FIG. 15

2REG62

| FIRST BYTE | SECOND BYTE | THIRD BYTE | FOURTH BYTE | FIFTH BYTE | SIXTH BYTE | SEVEN BYTE | EIGHTH BYTE |
|---|---|---|---|---|---|---|---|
| IDENTIFICATION ID | CAN ID | BIT NUMBER OF ACQUIRED DATA FOR 1SPIREG | STARTING POSITION OF ACQUIRED DATA FOR 1SPIREG | STARTING POSITION FOR STORING ACQUIRED DATA FOR 1SPIREG IN CAN DATA | BIT NUMBER OF ACQUIRED DATA FOR 2SPIREG | STARTING POSITION OF ACQUIRED DATA FOR 2SPIREG | STARTING POSITION FOR STORING ACQUIRED DATA FOR 2SPIREG IN CAN DATA |
| NINTH BYTE | TENTH BYTE | ELEVENTH BYTE | | | | | |
| BIT NUMBER OF ACQUIRED DATA FOR 3SPIREG | STARTING POSITION OF ACQUIRED DATA FOR 3SPIREG | STARTING POSITION FOR STORING ACQUIRED DATA FOR 3SPIREG IN CAN DATA | | | | | |

FIG. 19

| FRAME | ITEM | CHANGING BIT NUMBER |
|---|---|---|
| f1 | DATA 1 | 2 |
| f2 | DATA 2 | 2 |
| f3 | DATA 3 | 8 |
| f4 | DATA 4 | 11 |
| f5 | DATA 5 | 13 |
| f6 | DATA 6 | 12 |
| f7 | DATA 7 | 6 |
| f8 | DATA 8 | 3 |

FIG. 20

(X REFERS TO BIT TO BE CHANGED)

| bit | ADDRESS | | | | | | | | OTHERS | | | | | | | | DATA | | | | | | | | | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| f1 | | | | | | | | | | | | | | | | | | | | | x | x | | | | | | | | | | |
| f2 | | | | | | | | | | | | | | | | | | | | | | x | x | | | | | | | | | |
| f3 | | | | | | | | | | | | | | | | | | | x | x | x | x | x | x | x | | | | | | | |
| f4 | | | | | | | | | | | | | | | | | | | | | | | | x | x | x | | | | | | |
| f5 | | | | | | | | | | | | | | | | | | | | | x | x | x | x | x | x | x | x | x | x | x | |
| f6 | | | | | | | | | | | | | | | | | x | x | x | x | | | | | | x | x | x | x | x | x | x |
| f7 | | | | | | | | | | | | | | | | | x | x | x | x | | | | | | | | | | | | |
| f8 | | | | | | | | | | | | | | | | | | | | | | x | x | x | | | | | | | | |

VEHICLE CONTROL SYSTEM AND CIRCUIT DEVICE

CROSS REFERENCE TO RELATED APPLICATION

The present application claims the benefit of priority from Japanese Patent Application No. 2021-143380 filed on Sep. 2, 2021. The entire disclosure of the above application is incorporated herein by reference.

TECHNICAL FIELD

The present disclosure relates to a vehicle control system and a circuit device.

BACKGROUND

In a vehicle control system, it is conceivable to use software processing of a microcomputer in order to convert a communication frame into another communication frame having a different communication protocol.

SUMMARY

A vehicle control system communicably connects with an electronic controller and a control circuit. The control circuit is controlled by the electronic controller as a control target. The vehicle control system communicates with the electronic controller using a control communication frame and communicates with the control circuit using a circuit communication frame. The control communication frame and the circuit communication frame have different formats from one another. The vehicle control system comprises at least one of a first sequence circuit converting the control communication frame into the circuit communication frame or a second sequence circuit converting the circuit communication frame into the control communication frame.

BRIEF DESCRIPTION OF DRAWINGS

Objects, features and advantages of the present disclosure will become apparent from the following detailed description made with reference to the accompanying drawings. In the drawings:

FIG. 2 is a diagram showing information stored in a first register;

FIG. 3 is a diagram showing information stored in a second register;

FIG. 14 is a diagram showing fixed information stored in a fifth register;

FIG. 15 is a diagram showing formulation information stored in a second register;

FIG. 19 is a schematic diagram showing a configuration of data to be converted by SPI communication;

FIG. 20 is a schematic diagram showing a configuration of the SPI frame;

DETAILED DESCRIPTION

Figure 1:
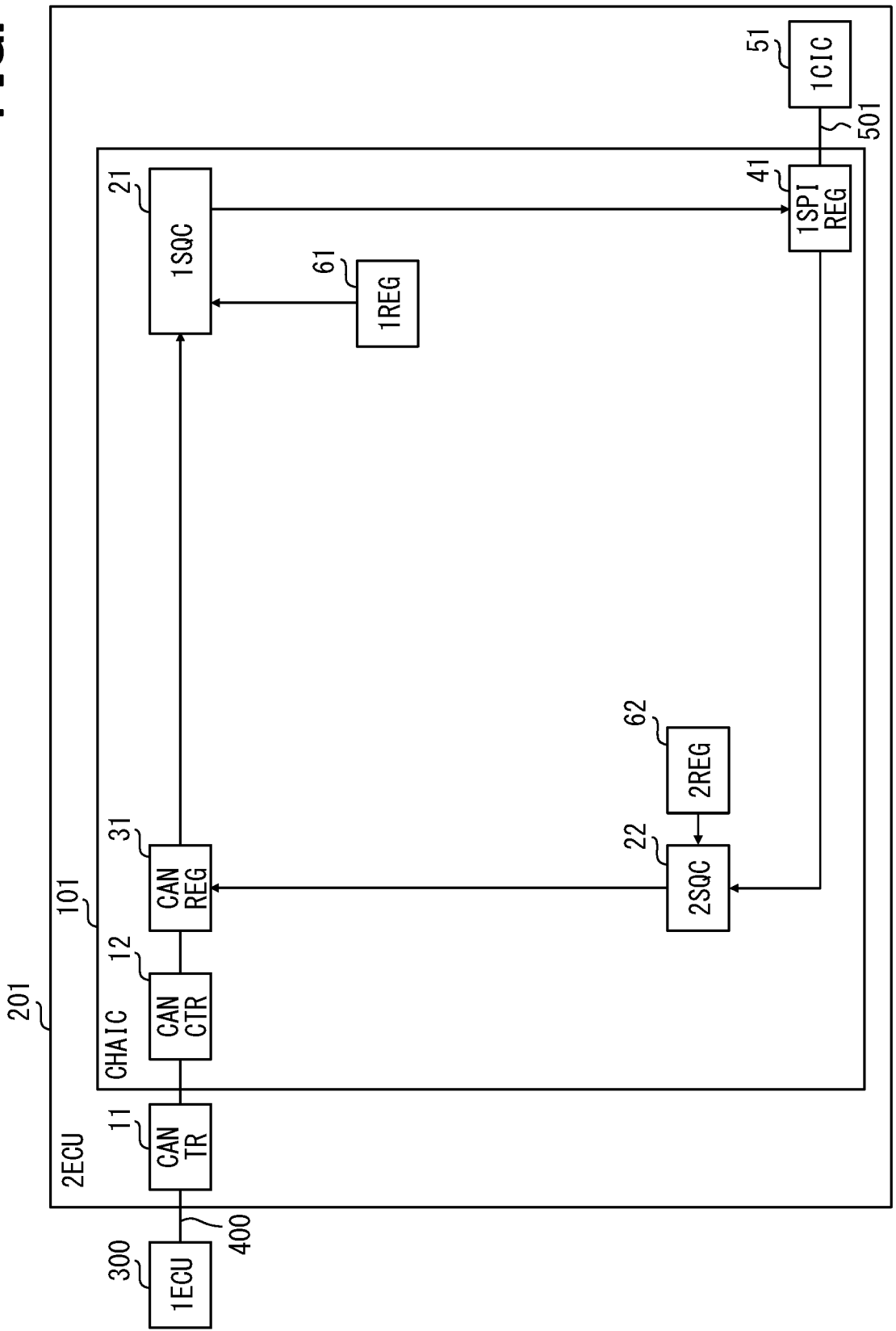
FIG. 1 is a block diagram showing a schematic configuration of a vehicle communication system according to a first embodiment.

In a known vehicle control system, depending on the environment at which the vehicle control system is positioned, cost increases due to vibration countermeasures and heat countermeasures. Thus, how to use less microcomputers in response to the above has been taken into consideration.

The subject application provides a vehicle control system capable of converting a communication frame without processing by software, and a circuit device capable of converting a communication frame without processing by software.

A vehicle control system is communicably connected with an electronic controller and a control circuit. The control circuit is controlled by the electronic controller as a control target. The vehicle control system communicates with the electronic controller using a control communication frame and communicates with the control circuit using a circuit communication frame. The control communication frame and the circuit communication frame have different formats from one another. The vehicle control system includes at least one of a first sequence circuit converting the control communication frame into the circuit communication frame or a second sequence circuit converting the circuit communication frame into the control communication frame.

In this configuration, the vehicle control system includes at least one of the first sequence circuit that converts the control communication frame into the circuit communication frame or the second sequence circuit that converts the circuit communication frame into the control communication frame. The first sequence circuit and the second sequence circuit are provide by hard logic circuits. Therefore, the vehicle control system is capable of converting the communication frame without using software to process.

The circuit device in the present disclosure includes the above-described vehicle control system. Therefore, the circuit device can provide the same effect as the vehicle control system.

The disclosed aspects in this specification adopt different technical solutions from each other in order to achieve their respective objectives.

The following will describe multiple embodiments for implementing the present disclosure with reference to the drawings. In each embodiment, portions corresponding to those described in the preceding embodiment are denoted by the same reference numerals, and redundant descriptions will be omitted in some cases. In each of the embodiments, when only a part of the configuration is explained, remaining part of the embodiment can be referred to other embodiments explained previously and applied.

First Embodiment

A vehicle control system of the present embodiment will be described with reference to FIG. 1 to FIG. 6. The vehicle control system is configured to be mounted on a vehicle. The vehicle control system is mounted on the vehicle and performs various controls of the vehicle.

As shown in FIG. 1 and other drawings, each component is described by abbreviation. Specifically, a CAN transceiver 11 is described as CANTR, a CAN controller 12 is described as CANCTR, a first sequence circuit 21 is described as 1SQC, a second sequence circuit 22 is described as 2SQC, a CAN register 31 is described as CANREG, and an SPI register 41 is described as 1SPIREG. A control IC 51 is described as 1CIC, a first register 61 is described as 1REG, a second register 62 is described as 2REG, an ECU 201 is described as 2ECU, a conversion IC 101 is described as CHAIC, and an external ECU 300 is described as 1ECU. "ECU" is an abbreviation of "Electronic Control Unit".

(Structure)

A schematic configuration of the vehicle control system will be described with reference to FIG. 1. The vehicle control system includes the ECU 201, the external ECU 300, and a CAN bus 400 that communicably connects the ECU 201 and the external ECU 300. Alternatively, the present disclosure is not limited to this, and the vehicle control system can also be applied to the ECU 201. Similarly, in other embodiments, the vehicle control system can also be applied to the ECU 201. The external ECU 300 corresponds to an electronic controller. The ECU 201 corresponds to a circuit device.

In the present embodiment, as an example, the communication between the ECU 201 and the external ECU 300 is based on the CAN communication protocol (hereinafter referred to as CAN communication). In the ECU 201, an example of communication compliant with the SPI communication protocol between multiple ICs 51 and 101 is adopted. Alternatively, the present disclosure is not limited to this. The present disclosure can be applied under a condition that the communication protocol between the ECU 201 and the external ECU 300 is different from the communication protocol (communication standard) between the multiple ICs 51 and 101 in the ECU 201. CAN is a registered trademark. CAN is an abbreviation of Controller Area Network. SPI is an abbreviation of Serial Peripheral Interface.

(External ECU 300)

The external ECU 300 includes a microcomputer, and the microcomputer includes at least one CPU, at least one storage device, and the like. The external ECU 300 is connected to various sensors, other ECUs, and the like. The storage device stores programs, data, and the like. The data includes pre-stored data, a sensor signal received from the sensor, SPI data received via the CAN bus 400 described later, and the like.

In the external ECU 300, the CPU executes a program. The CPU executes the program to perform various types of calculation based on the data. The external ECU 300 outputs a control signal or the like as a result of the calculation. That is, the external ECU 300 has a calculation function and a controlling function for controlling the control IC 51.

As shown in FIG. 1, the external ECU 300 is connected to the ECU 201 via the CAN bus 400. The external ECU 300 includes a communication device that performs communication via the CAN bus 400. The communication device is a CAN transceiver, a CAN controller, or the like. The external ECU 300 transmits a communication frame including data (controlling data) indicating the control signal via the CAN bus 400. The external ECU 300 receives the communication frame transmitted from the ECU 201 via the CAN bus 400.

The communication frame transmitted via the CAN bus 400 is a CAN frame. This communication frame corresponds to a control communication frame. The CAN frame transmitted from the external ECU 300 includes an SPI address and the like in addition to the controlling data. On the other hand, the CAN frame transmitted from the ECU 201 includes the SPI data generated by the control IC 51, an SPI address of the control IC 51, and the like.

In the following, the controlling data and the SPI address are also referred collectively as CAN data. The CAN frame may include other CAN data different from the abovementioned CAN data. The other CAN data is a CAN ID assigned to the CAN frame and the like. The SPI address is an address of a transmission destination device of the controlling data in the CAN frame. The transmission destination device is a circuit included in the ECU 201, for example, the control IC 51 in the ECU 201. The SPI frame may include other SPI data different from the SPI address and the above-mentioned SPI data. The SPI frame corresponds to the circuit communication frame.

(ECU 201)

As shown in FIG. 1, the ECU 201 includes a CAN transceiver 11, a conversion IC 101, a control IC 51, and the like. Unlike the external ECU 300, the ECU 201 is composed of a hard logic circuit and does not include a microcomputer. IC is an abbreviation for integrated circuit.

The CAN transceiver 11, together with the CAN controller 12, constitutes a communication device for communication via the CAN bus 400. The CAN transceiver 11 may be built in the conversion IC 101.

The conversion IC 101 and the control IC 51 are hard logic circuits. The conversion IC 101 and the control IC 51 are connected via the SPI bus 501. The conversion IC 101 and the control IC 51 transmit and receive SPI frames via the SPI bus 501. The conversion IC 101 transmits the SPI frame obtained by converting the CAN frame to the control IC 51 via the SPI bus 501. The conversion IC 101 receives the SPI frame transmitted from the control IC 51 via the SPI bus 501.

The conversion IC 101 is a circuit that converts communication frames of different communication protocols. The conversion IC 101 has a communication frame conversion function, in other words, a communication protocol conversion function. The conversion IC 101 includes a CAN controller 12, multiple sequence circuits 21 and 22, and multiple registers 31, 41, 61, 62. The processing operation of the conversion IC 101 will be described later. The conversion of communication frames can be considered as the conversion of communication protocols and the conversion of communication standards.

Each of the sequence circuits 21 and 22 is a combinational hard logic circuit, and include multiple switching elements and the like. Each sequence circuit 21, 22 has a conversion function. The first sequence circuit 21 has a function of converting a CAN frame into an SPI frame. The second sequence circuit 22 has a function of converting an SPI frame into a CAN frame.

The CAN register 31 stores the data in the CAN frame received via the CAN bus 400. In this regard, the CAN register 31 stores the SPI address and the like in addition to the controlling data. The CAN register 31 stores the data to be transmitted in the CAN frame via the CAN bus 400. In this regard, the CAN register 31 stores the SPI data generated by the control IC 51, the SPI address of the control IC 51, and the like. By storing the SPI data, the SPI address, and the like in the CAN register 31, the conversion IC 101 can transmit the SPI data, the SPI address, and the like in the CAN frame.

The SPI register 41 stores data to be transmitted to the control IC 51 and data received from the control IC 51 via the SPI bus 501. That is to say, the SPI register 41 stores the data to be transmitted to the control IC 51 in the SPI frame, and also stores the data in the SPI frame received from the control IC 51. The data to be transmitted to the control IC 51 is the CAN data or the like. The data received from the control IC 51 is the SPI data, the SPI address, or the like. The conversion IC 101 can transmit the CAN data in the SPI frame by storing the CAN data in the SPI register 41.

The first register stores formulation information. The formulation information stored in the first register 61 is information used for converting the CAN data to the SPI frame. This formulation information is also known as SPI conversion information or first formulation information. As shown in FIG. 2, the formulation information includes the SPI protocol information (address/data of bit number and starting position), other SPI data, the position information for extracting the SPI address/data part from CAN data, and the like. The other data information in FIG. 2 is CRC (Cyclic Redundancy Check) or the like.

The second register 62 stores formulation information. The formulation information stored in the second register 62 is different from the formulation information stored in the first register 61. The formulation information stored in the second register 62 is information used for storing the SPI data generated by the control IC 51 and the SPI address of the control IC 51, and the like in the CAN frame. The formulation information stored in the second register 62 is also known as CAN conversion information or second formulation information. As shown in FIG. 3, the formulation information stored in the second register 62 includes SPI protocol information (address/number of data bit and starting position), CAN ID, position for storing the SPI address/data unit in CAN data, and the like.

The SPI conversion information and the CAN conversion information are known as information indicating a storage destination of an address and a storage destination of data according to the communication protocol of a storage destination communication frame in which the address and the data are to be stored. The SPI conversion information includes information indicating the storage destination of the SPI address and the controlling data according to the communication protocol of the SPI frame, which is the storage destination communication frame of the SPI address and the controlling data. The CAN conversion information includes information indicating the storage destination of the SPI address and the SPI data according to the communication protocol of the CAN frame, which is the storage destination communication frame of the SPI address and the SPI data.

In addition to the conversion IC 101, the control IC 51 is connected to a device to be controlled such as an actuator (not shown). The control IC 51 receives the SPI frame from the conversion IC 101 via the SPI bus 501. The received SPI frame contains the CAN data and the like. The control IC 51 transmits the SPI frame to the conversion IC 101 via the SPI bus 501. The SPI frame, which is going to be transmitted, includes the SPI data generated by the control IC 51, the SPI address of the control IC 51, and the like. The control IC 51 controls the device to be controlled according to the controlling data included in the CAN data. The control IC 51 corresponds to a control unit. The control IC 51 is also known as a drive IC.

The communication between the control IC 51 and the conversion IC 101 is not limited to the communication conforming to the SPI protocol. The communication between the control IC 51 and the conversion IC 101 may conform to other serial communication protocols such as I2C. I2C is a registered trademark. I2C is an abbreviation for Inter-Integrated Circuit.

(Brief to the Above)

As described above, the vehicle control system includes an ECU 201 including a hard logic circuit, and an external ECU 300 mainly composed of a microcomputer. In the vehicle control system, various functions are arranged in the ECU 201 and the external ECU 300.

An actuator, which is a control target device, generates heat or vibrates when it is turned on. In order to reduce the number of wires and increase mountability, the controller may be arranged in the immediate vicinity of the actuator.

Since the external ECU 300 has a microcomputer, the function can be flexibly improved by mounting the latest chipset. In the vehicle control system, the calculation functions are integrated on the side of the external ECU 300. In other words, the vehicle control system does not deploy the calculation function in the ECU 201.

In view of the above, the ECU 201 can be miniaturized and power can be saved. Therefore, the ECU 201 has a higher degree of freedom in mounting than the external ECU 300. The ECU 201 is superior in vibration resistance and heat resistance to the external ECU 300. That is to say, the ECU 201 has less increase in cost due to vibration countermeasures and heat countermeasures than the external ECU 300. Therefore, the ECU 201 is easier to be placed in the immediate vicinity of the actuator than the external ECU 300. In this regard, in the vehicle control system, arranging the ECU 201 in the immediate vicinity of the actuator reduces the number of wires and increases the mountability. Since the ECU is implemented by the hard logic circuit, the ECU 201 does not require software development.

The vehicle control system can reduce the number of wire harnesses and increase the mountability while suppressing the increase in cost due to vibration countermeasures and heat countermeasures. Arranging the actuator in the immediate vicinity means that the ECU 201 is directly attached to the actuator, or the ECU 201 is positioned adjacent to the actuator.

The external ECU 300 and the ECU 201 perform CAN communication, which is known as a relatively stable communication. That is, CAN communication, which has better noise immunity than serial communication, is applied between the external ECU 300 and the ECU 201. On the other hand, the ECU 201 has a configuration for communicating between the ICs 51 and 101 in accordance with the SPI protocol.

As described above, the communication protocol between the external ECU 300 and the ECU 201 is different from the communication protocol between the ICs 51 and 101. Therefore, in order to control the control IC 51 by the external ECU 300, it is necessary to convert the communication protocol. In order to transmit the SPI data of the control IC 51 or the like to the external ECU 300, it is necessary to convert the communication protocol. In this regard, in the present disclosure, the communication protocol conversion function is deployed in the ECU 201.

The external ECU 300 may be equipped with the communication protocol conversion function. However, when the ECU 300 is equipped with the communication protocol conversion function, a serial communication is performed between the external ECU 300 and the ECU 201, and the serial communication is inferior in noise immunity to CAN communication as described above.

(Processing Operations)

The processing operations of the conversion IC 101 will be described with reference to FIG. 4 and FIG. 5. Here, as an example of the processing operations of the conversion IC 101, the conversion function of the communication protocol will be described.

First, the processing operations of conversion from the CAN frame to the SPI frame will be described with reference to FIG. 4.

When controlling the control IC 51, the external ECU 300 transmits the CAN frame including the CAN data via the CAN bus 400. On the other hand, the ECU 201 receives the CAN frame via the CAN transceiver 11 and the CAN controller 12. The CAN controller 12 stores the CAN data and the like of the received CAN frame in the CAN register 31.

Figure 4:
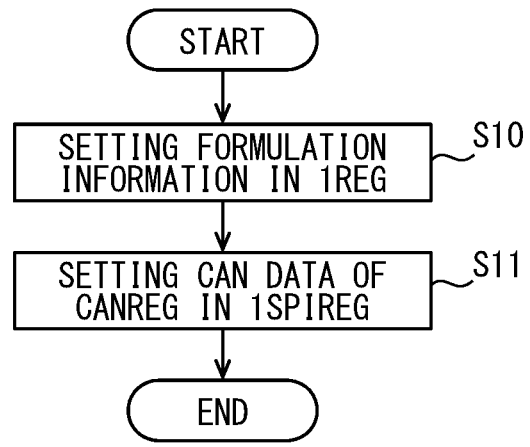
FIG. 4 is a flowchart showing a processing operation related to an SPI frame by a conversion IC.

At the time that the conversion IC 101 receives the CAN frame in the CAN controller 12, the conversion IC 101 may execute the processing operations shown in the flowchart of FIG. 4. When the CAN data is stored in the CAN register 31, the conversion IC 101 may execute the processing operations shown in the flowchart of FIG. 4.

In S10, the formulation information is set (stored) in the first register 61. In order to convert the CAN frame into the SPI frame, the SPI conversion information is set in the first register 61.

Figure 6:
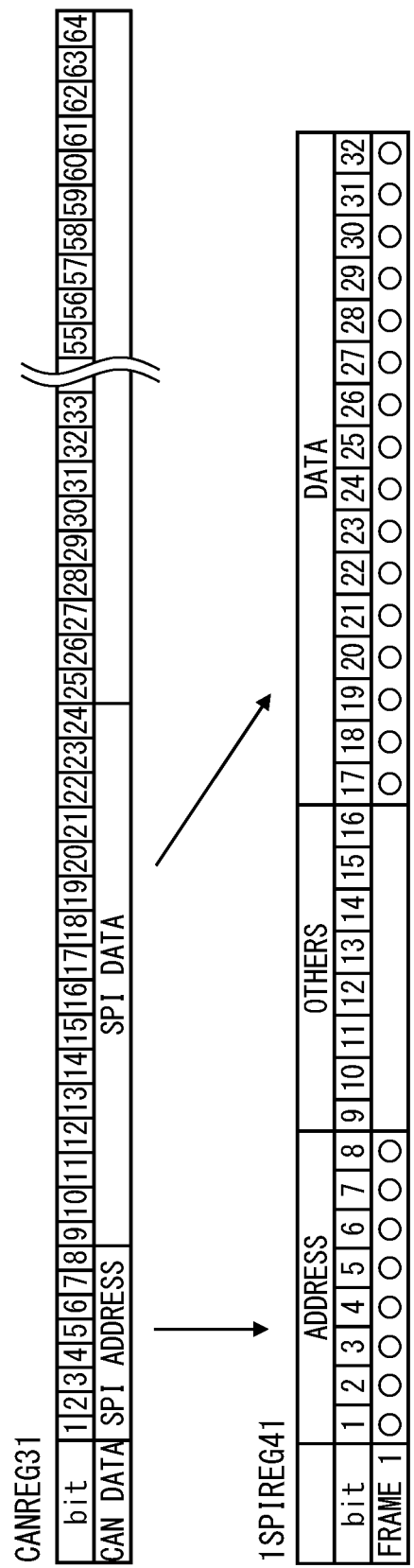
FIG. 6 is a diagram showing a conversion process from the CAN frame to the SPI frame.

In S11, the CAN data in the CAN register 31 is set in the SPI register 41. More specifically, as shown in FIG. 6, the first sequence circuit 21 stores the CAN data of the CAN register 31 in the SPI register 41 according to the formulation information of the first register 61. The first sequence circuit 21 extracts the SPI address and the controlling data from the CAN data according to the formulation information. The first sequence circuit 21 stores the extracted SPI address in an address portion of the SPI register 41 according to the formulation information. The first sequence circuit 21 stores the extracted controlling data in a data portion of the SPI register 41 according to the formulation information. As a result, the CAN data is stored in the SPI frame. The first sequence circuit 21 may also store other CAN data in the SPI frame.

The first sequence circuit 21 stores the CAN data in the SPI register 41 as described above, thereby converting the CAN frame into the SPI frame. The above can be considered as the first sequence circuit 21 performs frame conversion by extracting, from the CAN frame received from the external ECU 300, the address and data for generating the SPI frame and storing the extracted address and data in the SPI frame. Then, the conversion IC 101 transmits the SPI frame containing the data stored in the SPI register 41 via the SPI bus 501.

As described above, the vehicle control system includes the address and data of SPI frame, which is the communication frame of conversion destination, in the CAN data of CAN frame, which is the communication frame before conversion. Thus, the data of SPI frame can be transmitted to any address of conversion destination. As described above, the address of SPI frame, which is included in the CAN data of CAN frame, is set as an address of a register included in the control IC 51. The data included in the CAN frame is controlling data. Transmitting the controlling data to any address means transmitting the controlling data included in the CAN data to the address of register included in the control IC 51.

Next, the process of converting the SPI frame to the CAN frame will be described with reference to FIG. 5.

The control IC 51 receives the SPI frame via the SPI bus 501. The control IC 51 controls the device to be controlled according to the data stored in the data portion of the SPI frame. The control IC 51 inputs, to a data register, information obtained by controlling the device to be controlled and a flag set in response to an abnormality detection. Then, the control IC 51 transmits the SPI frame via the SPI bus 501. The SPI frame includes the data input to the data register and the address of the data register. The address of data register corresponds to the SPI address. In response to the conversion IC 101 receiving the SPI frame, the conversion IC 101 stores the received SPI data and the SPI address in the SPI register 41.

Figure 5:
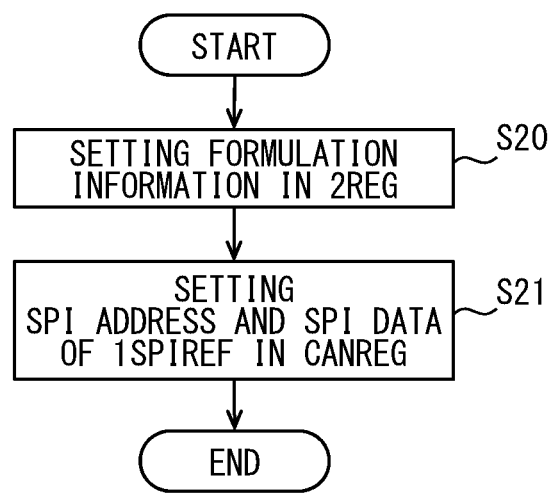
FIG. 5 is a flowchart showing a processing operation related to a CAN frame by the conversion IC.

Upon receiving the SPI frame, the conversion IC 101 may execute the process shown in the flowchart of FIG. 5. Alternatively, in response to the data included in the SPI frame data being stored in the SPI register 41, the conversion IC 101 may execute the process shown in the flowchart of FIG. 5.

In S20, the formulation information is set in the second register 62. In order to convert the SPI frame into the CAN frame, the CAN conversion information is set in the second register 62.

In S21, the SPI address and SPI data of the SPI register 41 are set in the CAN register 31. More specifically, the second sequence circuit 22 stores the SPI address and SPI data of the SPI register 41 in the CAN register 31 according to the formulation information of the second register 62. The second sequence circuit 22 extracts the SPI address and SPI data of the SPI frame according to the formulation information. The second sequence circuit 22 stores the extracted SPI address and SPI data in the data portion of the CAN register 31 according to the formulation information. As a result, the SPI address and SPI data are stored in the CAN frame. The second sequence circuit 22 may also store other SPI data in the CAN frame.

The second sequence circuit 22 converts the SPI frame into the CAN frame by storing the SPI address and the SPI data in the CAN register 31 as described above. The above can be considered as the second sequence circuit 22 performs frame conversion by extracting the SPI address and SPI data of the SPI frame from the SPI frame received from the control IC 51 and storing the extracted SPI frame and SPI address in the CAN frame. Then, the conversion IC 101 transmits the CAN frame including the data stored in the CAN register 31 via the CAN bus 400.

In this regard, the vehicle control system includes the SPI address and SPI data of the SPI frame, which corresponds to the pre-conversion communication frame, in the CAN frame, which corresponds to the post-conversion communication frame. The pre-conversion communication frame refers to the communication frame before protocol conversion, and the post-conversion communication frame refers to the communication frame after protocol conversion. With this configuration, the vehicle control system can transmit arbitrary address before conversion. As described above, the address and data to be included in the CAN frame data are the SPI address and SPI data received from the control IC 51. Transmitting the arbitrary address before conversion refers to transmitting the SPI address received from the control IC 51 to the external ECU 300.

(Effect)

As described above, the vehicle control system includes the first sequence circuit 21 that converts the CAN frame into the SPI frame, and the second sequence circuit 22 that converts the SPI frame into the CAN frame. Therefore, the vehicle control system is capable of converting a communication frame without using software to process. When the vehicle control system is applied to the ECU 201, the ECU 201 can exert the same effect. The present disclosure can achieve the same effect as long as the vehicle control system includes at least one of the first sequence circuit 21 or the second sequence circuit 22.

The vehicle control system can convert the communication frame by using the first sequence circuit 21 and the second sequence circuit 22. Since the first sequence circuit 21 and the second sequence circuit 22 are configured by hard logic circuits, the vehicle control system can convert the communication frame by the hard logic circuit. Therefore, even if the communication protocol between the external ECU 300 and the ECU 201 is different from the communication protocol between the conversion IC 101 and the control IC 51, the vehicle control system can control the control IC 51 without having a microcomputer in the ECU 201

The vehicle control system converts the communication frame by using a hard logic circuit. In general, unlike a microcomputer, a hard logic circuit cannot be rewritten by a program, and there is a concern that the bus load will increase with an increase in communication load between ECUs.

In the present disclosure, the vehicle control system can freely change the controlling data by assigning, in the CAN frame, the address and data. The vehicle control system may store, in a storage device, formulation information corresponding to the communication frame in association with predetermined identification information so that the communication frame can be transmitted to different ICs having different communication protocols. This configuration also applies to multiple same ICs having the same communication protocol. Thus, the transmission destination can be freely changed by this configuration.

In the CAN communication, the vehicle control system can transmit multiple communication frames by including only the bit information of multiple communication frames in the CAN data. Therefore, the vehicle control system can reduce the bus load even if the communication frames are converted by the hard logic circuit. The bit information refers to SPI address or controlling data.

One embodiment of the present disclosure has been described above. The present disclosure is not limited to the above embodiment. Various modifications may be made without departing from the scope and spirit of the present disclosure. Hereinafter, as other forms of the present disclosure, second to fifth embodiments will be described. The above-described embodiment and the second to fifth embodiments may be implemented independently or in combination as appropriate. The present disclosure is not limited to the combinations described in the embodiments, and may be implemented in various combinations.

Second Embodiment

Figure 7:
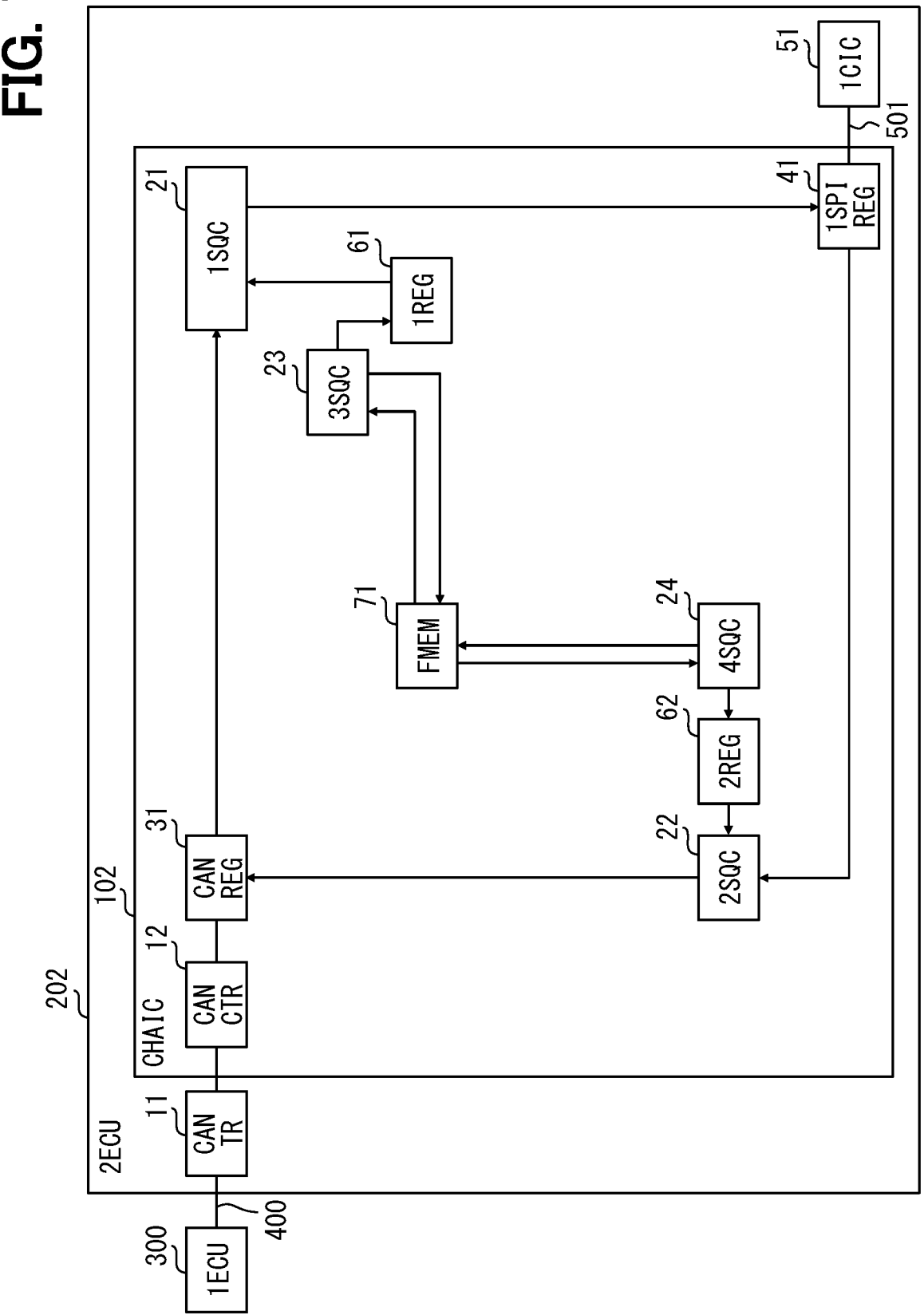
FIG. 7 is a block diagram showing a schematic configuration of a vehicle communication system according to a second embodiment.
Figure 8:
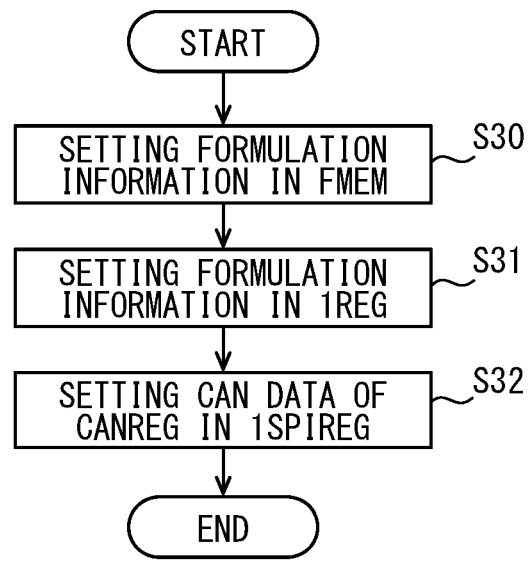
FIG. 8 is a flowchart showing a processing operation related to an SPI frame by a conversion IC.
Figure 9:
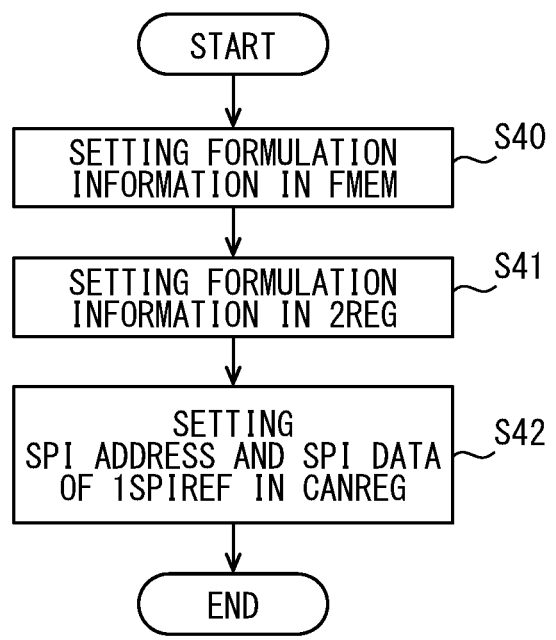
FIG. 9 is a flowchart showing a processing operation related to a CAN frame by the conversion IC.

The vehicle control system of the second embodiment will be described with reference to FIG. 7 to FIG. 9. In the present embodiment, portions different from the first embodiment will be mainly described. In the present embodiment, the configuration and processing operation of the ECU 202 (conversion IC 102) are different from those in the first embodiment. As shown in FIG. 7 and the like, each component is described by abbreviation. Specifically, FMEM refers to a flash memory 71, 3SQC refers to a third sequence circuit 23, and 4SQC refers to a fourth sequence circuit 24.

As shown in FIG. 7, the ECU 202 includes the conversion IC 102. The conversion IC 102 includes the third sequence circuit 23, the fourth sequence circuit 24, and the flash memory 71, in addition to the configuration of the conversion IC 101 of the first embodiment.

The flash memory 71 is an example of the storage device. The flash memory 71 stores the SPI conversion information and the CAN conversion information, which are described in the above embodiment. The flash memory 71 is built in the conversion IC 102. In another embodiment, the flash memory 71 may also be provided outside the conversion IC 102.

The third sequence circuit 23 and the fourth sequence circuit 24 each includes multiple switching elements and the like. The third sequence circuit 23 acquires, from the flash memory 71, the SPI conversion information, and stores the acquired SPI conversion information in the first register 61. The fourth sequence circuit 24 acquires, from the flash memory 71, the CAN conversion information, and stores the acquired CAN conversion information in the second register 62.

In the present embodiment, the processing operations of the conversion IC 102 will be described with reference to FIG. 8 and FIG. 9. Here, as an example of the processing operations of the conversion IC 102, the conversion function of the communication protocol will be described.

First, the processing operations of conversion from the CAN frame to the SPI frame will be described with reference to FIG. 8. A trigger for starting the flowchart of FIG. 8 is the same as a trigger in the first embodiment. This also applies to other embodiments.

In S30, the formulation information (the SPI conversion information) is set in the flash memory 71.

In S31, the formulation information is set in the first register 61 in the same manner as S10. In the present embodiment, the third sequence circuit 23 acquires the formulation information from the flash memory 71, and sets the acquired formulation information in the first register 61. S32 is the same as S11.

Next, the process of converting the SPI frame to the CAN frame will be described with reference to FIG. 9. A trigger for starting the flowchart of FIG. 9 is the same as the trigger in the first embodiment. This also applies to other embodiments.

In S40, the formulation information (the CAN conversion information) is set in the flash memory 71.

In S41, the formulation information is set in the second register 62 in the same manner as S20. In the present embodiment, the fourth sequence circuit 24 acquires the formulation information from the flash memory 71, and sets the acquired formulation information in the second register 62. S42 is the same as S21.

The vehicle communication system of the second embodiment has the same effect as the vehicle communication system of the first embodiment. The vehicle communication system of the second embodiment stores the information stored in the flash memory 71. In this regard, the vehicle communication system of the second embodiment can be converted into multiple communication protocols. In the present disclosure, at least one of the first sequence circuit 21 or the second sequence circuit 22 may be configured to perform the frame conversion.

Third Embodiment

Figure 10:
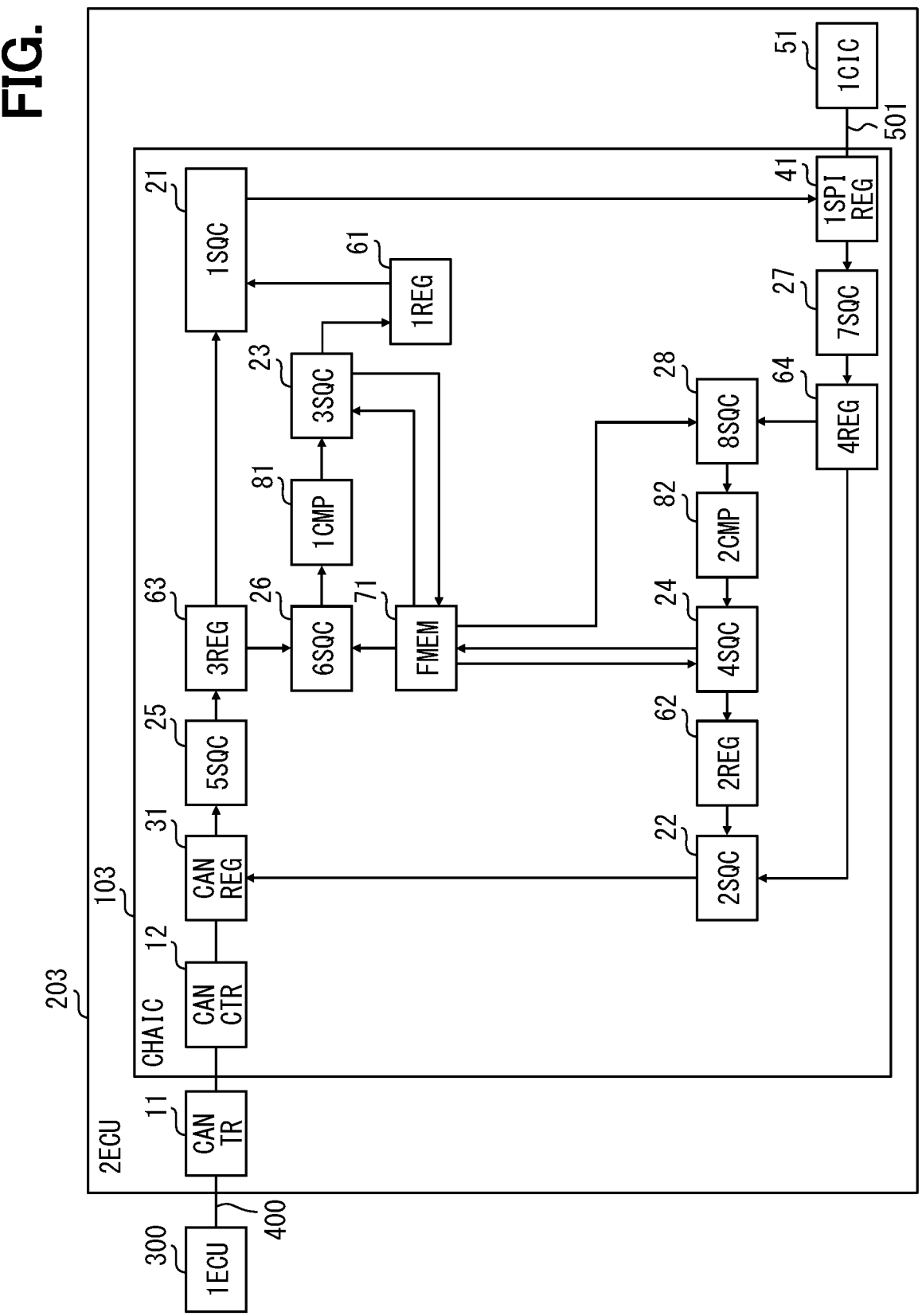
FIG. 10 is a block diagram showing a schematic configuration of a vehicle communication system according to a third embodiment.
Figure 11:
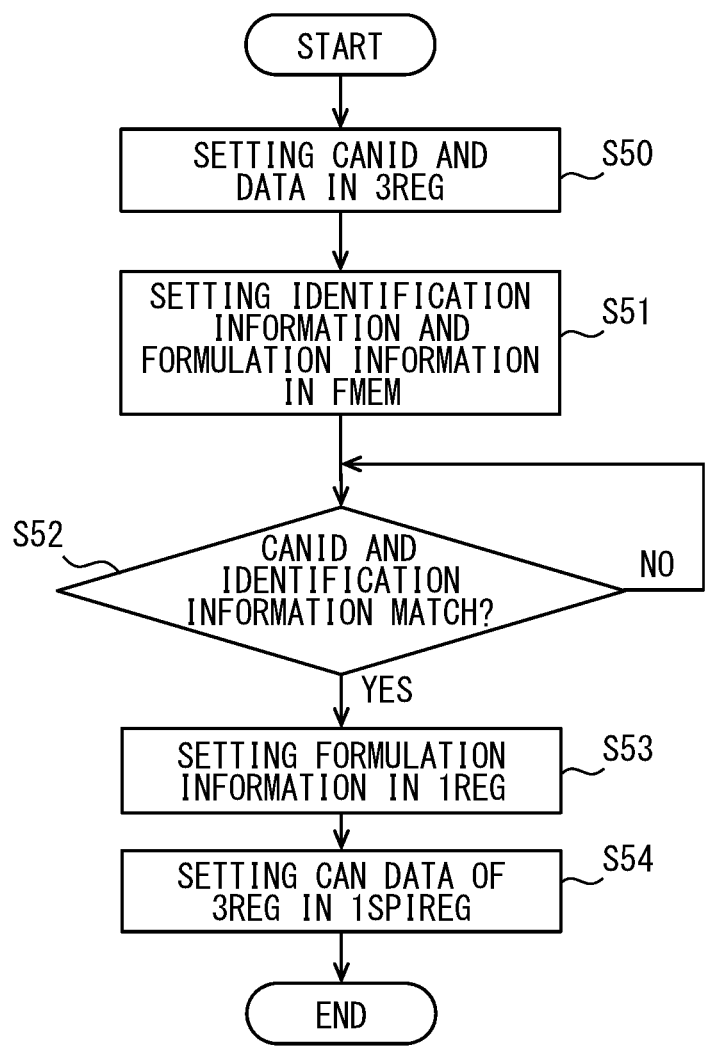
FIG. 11 is a flowchart showing a processing operation related to an SPI frame by a conversion IC.
Figure 12:
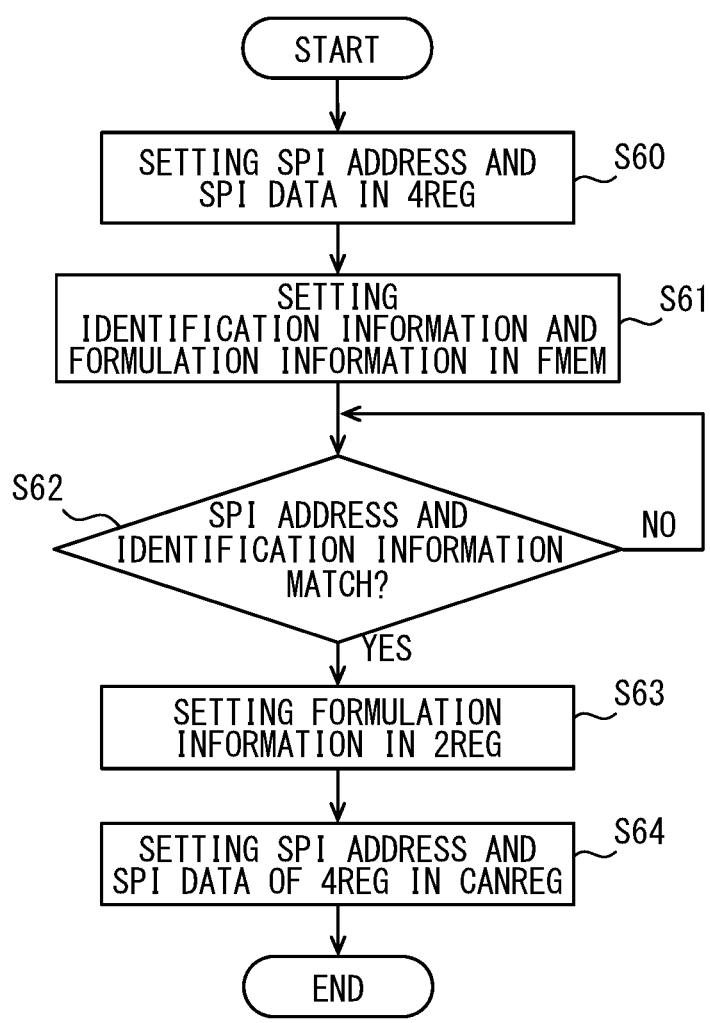
FIG. 12 is a flowchart showing a processing operation related to a CAN frame by the conversion IC.

The vehicle control system of the third embodiment will be described with reference to FIG. 10 to FIG. 12. In the present embodiment, portions different from the second embodiment will be mainly described. In the present embodiment, the configuration and processing operation of the ECU 203 (conversion IC 103) are different from those in the second embodiment. As shown in FIG. 10 and the like, each component is described by abbreviation. Specifically, 5SQC refers to a fifth sequence circuit 25, 3REG refers to a third register 63, 6SQC refers to a sixth sequence circuit 26, and 1CMP refers to a first comparator 81. 7SQC refers to a seventh sequence circuit 27, 4REG refers to a fourth register 64, 8SQC refers to an eighth sequence circuit 28, and 2CMP refers to a second comparator 82.

As shown in FIG. 10, the ECU 203 includes the conversion IC 103. The conversion IC 103 includes the fifth sequence circuit 25, the third register 63, the sixth sequence circuit 26, and the first comparator 81, in addition to the configuration of the conversion IC 102. The conversion IC 103 also includes the seventh sequence circuit 27, the fourth register 64, the eighth sequence circuit 28, and the second comparator 82.

The flash memory 71 stores the identification information, which is preliminarily assigned to the pre-conversion communication frame, in association with the formulation information of the pre-conversion communication frame. The flash memory 71 stores the identification information preliminarily assigned to the CAN frame, which is the pre-conversion communication frame, and the formulation information (SPI conversion information) for the CAN frame in association with each other. The flash memory 71 may also store multiple records of identification information and respective multiple records of SPI conversion information in association with each other. As the identification information, CANID or the identification information assigned to the CAN frame may be used. The identification information can also be an identification ID.

The flash memory 71 stores the identification information preliminarily assigned to the SPI frame, which is the pre-conversion communication frame, and the formulation information (CAN conversion information) for the SPI frame in association with each other. The flash memory 71 may also stores multiple records of identification information and respective multiple records of CAN conversion information in association with each other. As the identification information, the SPI address or the identification information assigned to the SPI frame may be used.

In the present embodiment, with reference to FIG. 11 and FIG. 12, the processing operations of the conversion IC 103 will be described together with the configuration of the conversion IC 103.

The fifth sequence circuit 25 and the sixth sequence circuit 26 each includes multiple switching elements and the like. As shown in FIG. 11, the fifth sequence circuit 25 stores the CAN data and CAN ID, which are included in the CAN register 31, in the third register 63 (S50). The formulation information (SPI conversion information) and the multiple records of identification information associated with the SPI conversion information are set in the flash memory 71 (S51).

The sixth sequence circuit 26 inputs the CANID stored in the third register 63 and the SPI conversion information stored in the flash memory 71 to the first comparator 81. More specifically, the sixth sequence circuit 26 inputs, to the first comparator 81, the CANID stored in the third register 63, and sequentially inputs, to the first comparator 81, each identification information associated with each of the multiple records of SPI conversion information. The first comparator 81 compares the CANID with each of the multiple records of identification information in order (S52). The first comparator 81 outputs the identification information that matches the CANID.

The identification information output from the first comparator 81 is input to the third sequence circuit 23. The third sequence circuit 23 acquires, from the flash memory 71, the SPI conversion information associated with the identification information, which is output from the first comparator 81, and stores the acquired SPI conversion information in the first register 61 (S53). The process executed in S54 is similar to the process executed in S11.

On the other hand, the seventh sequence circuit 27 and the eighth sequence circuit 28 each includes multiple switching elements and the like. The seventh sequence circuit 27 acquires, from the SPI register 41, the SPI address and SPI data, and sets the acquired SPI address and SPI data in the fourth register 64 (S60). The formulation information (CAN conversion information) and the multiple records of identification information associated with the CAN conversion information are set in the flash memory 71 (S61).

The eighth sequence circuit 28 inputs, to the second comparator 82, the SPI address stored in the fourth register 64 and the CAN conversion information stored in the flash memory 71. More specifically, the eighth sequence circuit 28 inputs, to the second comparator 82, the SPI address stored in the fourth register 64, and sequentially inputs, to the second comparator, each of the multiple records of identification information associated with respective multiple records of CAN conversion information. The second comparator 82 compares the SPI address with each of the multiple records of identification information in order (S62). The second comparator 82 outputs the identification information that matches the SPI address.

The identification information output from the second comparator 82 is input to the fourth sequence circuit 24. The fourth sequence circuit 24 acquires, from the flash memory 71, the CAN conversion information associated with the identification information, which is output from the second comparator 82, and stores the acquired CAN conversion information in the second register 62 (S63). The process executed in S64 is similar to the process executed in S21.

As described above, the first sequence circuit 21 converts, according to the formulation information related to the pre-conversion CAN frame, the CAN frame to the SPI frame by storing the SPI address and the controlling data in the SPI frame. Similarly, the second sequence circuit 22 converts, according to the formulation information related to the pre-conversion SPI frame, the SPI frame to the CAN frame by storing the SPI address and the SPI data in the CAN frame.

The vehicle communication system of the third embodiment has the same effect as the vehicle communication system of the second embodiment. The vehicle communication system of the third embodiment can convert the communication frame corresponding to multiple communication frames by having the identification information associated with the formulation information.

Fourth Embodiment

Figure 13:
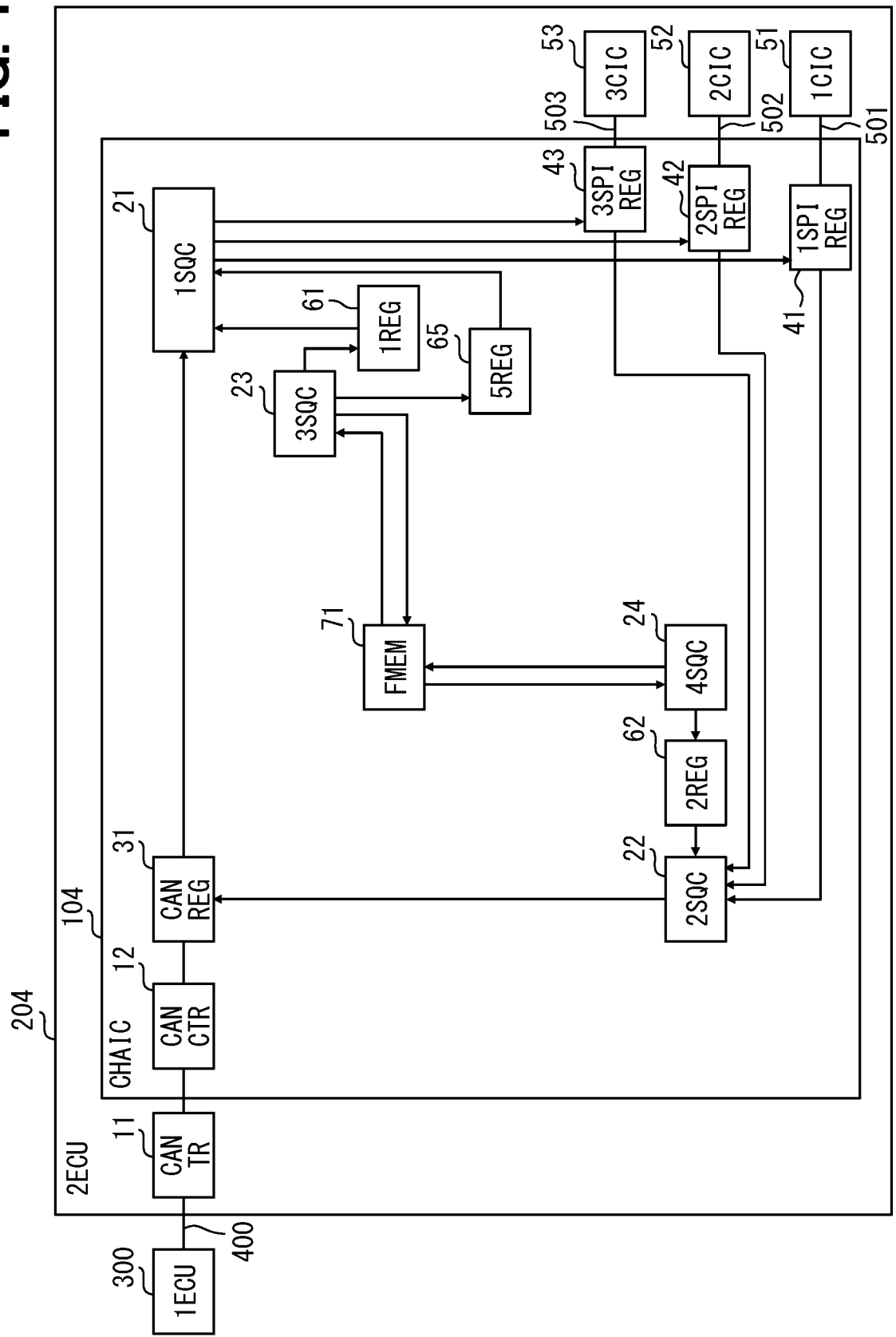
FIG. 13 is a block diagram showing a schematic configuration of a vehicle communication system according to a fourth embodiment.

The vehicle control system of the present embodiment will be described with reference to FIG. 13 to FIG. 20. In the present embodiment, portions different from the second embodiment will be mainly described. In the present embodiment, the configuration and processing operation of the ECU 204 (conversion IC 104) are different from those in the second embodiment. As shown in FIG. 13 and the like, each component is described by abbreviation. Specifically, 1 CIC refers to the first control IC 51, 2 CIC refers to the second control IC 52, 3 CIC refers to the third control IC 52, 1 SPIREG refers to the first SPI register 41, 2 SPIREG refers to the second SPI register 42, 3 SPIREG refers to the third SPI register 43, and 5REG refers to the fifth register 65. The first control IC 51 is similar to the control IC 52. The first SPI register 41 is similar to the SPI register 41.

The ECU 204 includes multiple control ICs 51, 52, 53. The ECU 204 includes multiple SPI buses 501 to 503. The conversion IC 104 includes multiple SPI registers 41 to 43. The conversion IC 104 includes a fifth register 65.

The second control IC 52 and the third control IC 53 are connected to a control target device, which is different from the control target device of the first control IC 51. The second control IC 52 is connected to a control target device different from a control target device of the third control IC 53. The second control IC 52 is connected to the second SPI register 42 via the second SPI bus 502. The third control IC 53 is connected to the third SPI register 43 via the third SPI bus 503.

The ECU 204 may have four or more control ICs. Similarly, the ECU 204 may include four or more SPI buses. The ECU 204 may include four or more SPI registers.

The processing operation of the conversion IC 104 will be described with reference to FIG. 13 to FIG. 20 in accordance with the conversion IC 104 and the configuration. The conversion IC 104 converts a single CAN frame into multiple SPI frames. The conversion IC 104 converts multiple frames into the single CAN frame.

FIG. 14 shows fixed information stored in the fifth register 65. The fixed information indicates same address and data in an extraction source communication frame and a storage destination communication frame. The fixed information is the information indicating a value that is the same in the CAN frame, which corresponds to the extraction source communication frame, and the SPI frame, which corresponds to the storage destination communication frame. The fixed information is the data (fixed bit information) for storing the SPI data. In the present embodiment, the fixed information corresponding to each of the multiple SPI registers 41 to 43 is used.

Figure 18:
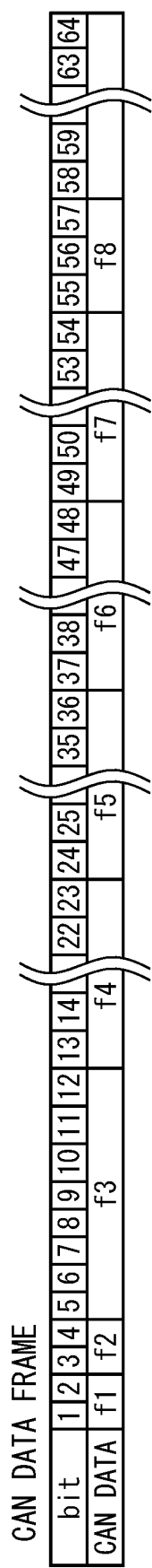
FIG. 18 is a schematic diagram showing a configuration of a CAN data frame.

FIG. 18 shows an example of the CAN frame. The CAN frame includes a portion of each SPI frame as CAN data. For example, partial data of the SPI frame f1 is stored in a first bit and a second bit of the CAN data. Partial data of the SPI frame f3 is stored in the fifth to twelfth bits of the CAN data. FIG. 19 shows the item and number of bits to be changed in each SPI frame f1 to f8. FIG. 20 shows each of the SPI frames f1 to f8 converted from the single CAN frame. The "x" mark in FIG. 20 indicates the data (bit) to be converted from the CAN data to each of the SPI frames f1 to f8. Therefore, other than the data to be converted in each SPI frame f1 to f8, the remaining data can be regarded as fixed information. Similarly, each SPI frame includes partial data of the CAN frame as the SPI address and the SPI data.

The first sequence circuit 21 converts the single CAN frame into multiple SPI frames according to the formulation information in the first register 61 and the fixed information in the fifth register 65.

Figure 16:
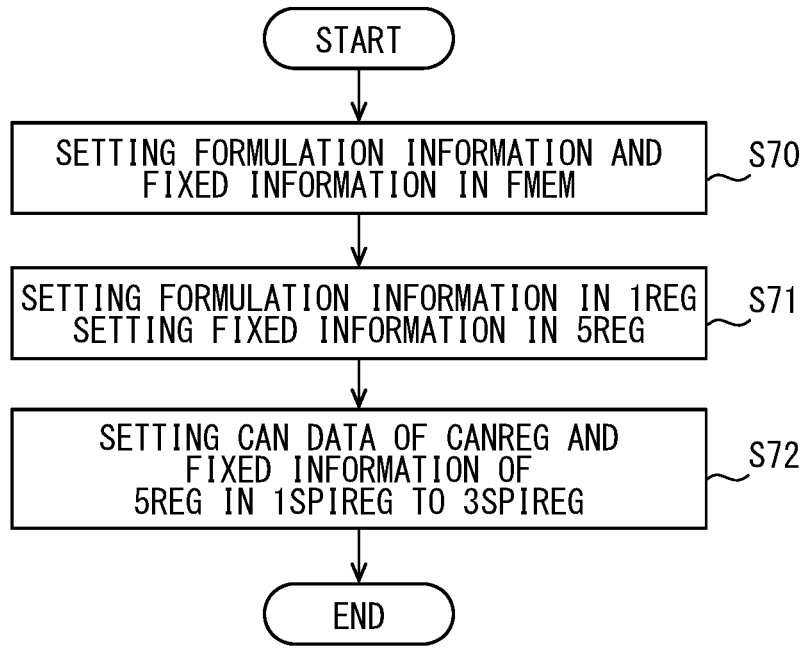
FIG. 16 is a flowchart showing a processing operation related to an SPI frame by a conversion IC.

As shown in FIG. 16, the formulation information (SPI conversion information) and the fixed information are set in the flash memory 71 (S70). Then, the third sequence circuit 23 acquires, from the flash memory, the SPI conversion information, and stores the acquired conversion information in the fifth register 65 (S71). The third sequence circuit 23 acquires, from the flash memory, the fixed information, and stores the acquired fixed information in the fifth register 65 (S71).

The first sequence circuit 21 converts the CAN frame into the SPI frame according to the SPI conversion information and the fixed information (S72). More specifically, the first sequence circuit 21 stores the CAN data of the CAN register 31 in each of the SPI registers 41 to 43 corresponding to the SPI address. The first sequence circuit 21 stores the fixed information in each of the SPI registers 41 to 43 corresponding to the SPI address.

Specifically, the first sequence circuit 21 extracts, from the CAN register 31, the SPI address and SPI data corresponding to the first SPI register 41. The first sequence circuit 21 extracts, from the fifth register 65, the fixed information corresponding to the first SPI register 41. Then, the first sequence circuit 21 performs frame conversion by storing the SPI address, the SPI data, and the fixed information, each of which corresponds to the extracted first SPI register 41, in the first SPI register 41.

The SPI address and SPI data correspond to the partial CAN data stored in the CAN register 31. The SPI address and SPI data also correspond to a part of the SPI frame, which is generated by storing the SPI address and SPI data extracted from the CAN data, in the first SPI register 41.

Similarly, the first sequence circuit 21 extracts the SPI address, SPI data, and fixed information corresponding to the second SPI register 42, and stores the extracted SPI address, SPI data, and fixed information in the second SPI register 42 for frame conversion. The first sequence circuit 21 extracts the SPI address, SPI data, and fixed information corresponding to the third SPI register 43, and stores the extracted SPI address, SPI data, and fixed information in the third SPI register 43 for frame conversion.

As described above, the conversion IC 104 converts the single CAN frame into the multiple SPI frames. Thereafter, the conversion IC 104 transmits the multiple SPI frames including the corresponding data stored in the SPI registers 41 to 43 via the corresponding SPI buses 501 to 503.

The formulation information (CAN conversion information) shown in FIG. 15 is stored in the second register 62. In the present embodiment, the formulation information corresponds to each of the multiple SPI registers 41 to 43. The second sequence circuit 22 converts the multiple SPI frames into the single CAN frame according to the formulation information.

Figure 17:
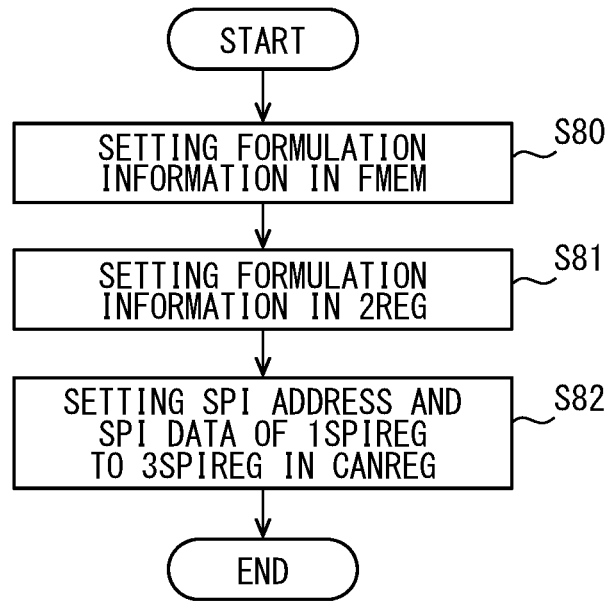
FIG. 17 is a flowchart showing a processing operation related to a CAN frame by the conversion IC.

As shown in FIG. 17, the formulation information is set in the flash memory 71 (S80). The fourth sequence circuit 24 acquires, from the flash memory 71, the formulation information, and stores the acquired formulation information in the second register 62 (S81).

Then, the second sequence circuit 22 stores the SPI addresses and SPI data of each of the SPI registers 41 to 43 in the CAN register 31 according to the formulation information in the second register 62 (S82). The second sequence circuit 22 extracts the SPI address and the SPI data, which are partial portion of the SPI frame, from the SPI registers 41 to 43 according to the formulation information. The second sequence circuit 22 stores the extracted SPI addresses and the SPI data of the SPI registers 41 to 43 in the data portion of the CAN register 31 according to the formulation information. As a result, the SPI address and SPI data of each of the SPI registers 41 to 43 are stored in the CAN frame.

The vehicle communication system of the third embodiment has the same effect as the vehicle communication system of the fourth embodiment. In the vehicle communication system of the fourth embodiment, fixed information is stored in the flash memory 71. Then, the conversion IC 104 acquires, from the flash memory, the fixed information corresponding to the SPI address, and stores the acquired fixed information in each of the SPI registers 41 to 43 corresponding to the SPI address. As a result, the external ECU 300 has no need to include the fixed information in the CAN frame when transmitting the CAN frame. That is, the external ECU 300 does not need to transmit the fixed information. Therefore, the vehicle communication system of the fourth embodiment can reduce the communication load of the CAN bus 400. The fixed information can also be applied to other embodiments.

One CAN frame contains partial data of each SPI frame, which is the frame after conversion. In this regard, the vehicle communication system of the fourth embodiment can reduce the amount of data transmitted from the external ECU 300 and can reduce the communication load of the CAN bus 400. Similarly, the single CAN frame includes partial data of each SPI frame, which is to be converted. Therefore, the vehicle communication system described in the fourth embodiment can reduce the communication load of the CAN bus 400.

Fifth Embodiment

Figure 21:
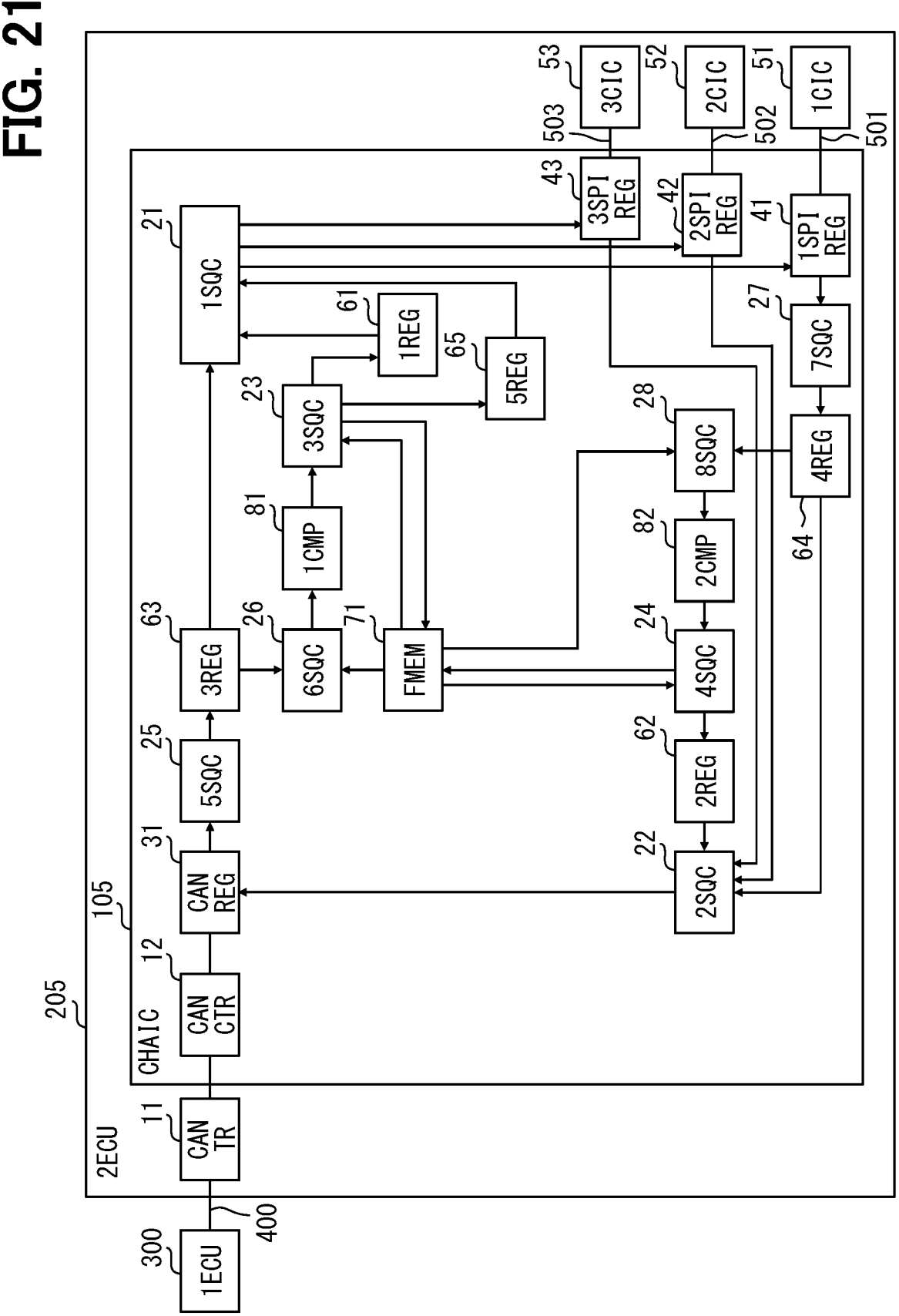
FIG. 21 is a block diagram showing a schematic configuration of a vehicle communication system according to a fifth embodiment.

The vehicle control system of the fifth embodiment will be described with reference to FIG. 21 to FIG. 23. This embodiment is a combination of the third embodiment and the fourth embodiment. The ECU 205 has a configuration in which the ECU 203 and the ECU 204 are combined.

Figure 22:
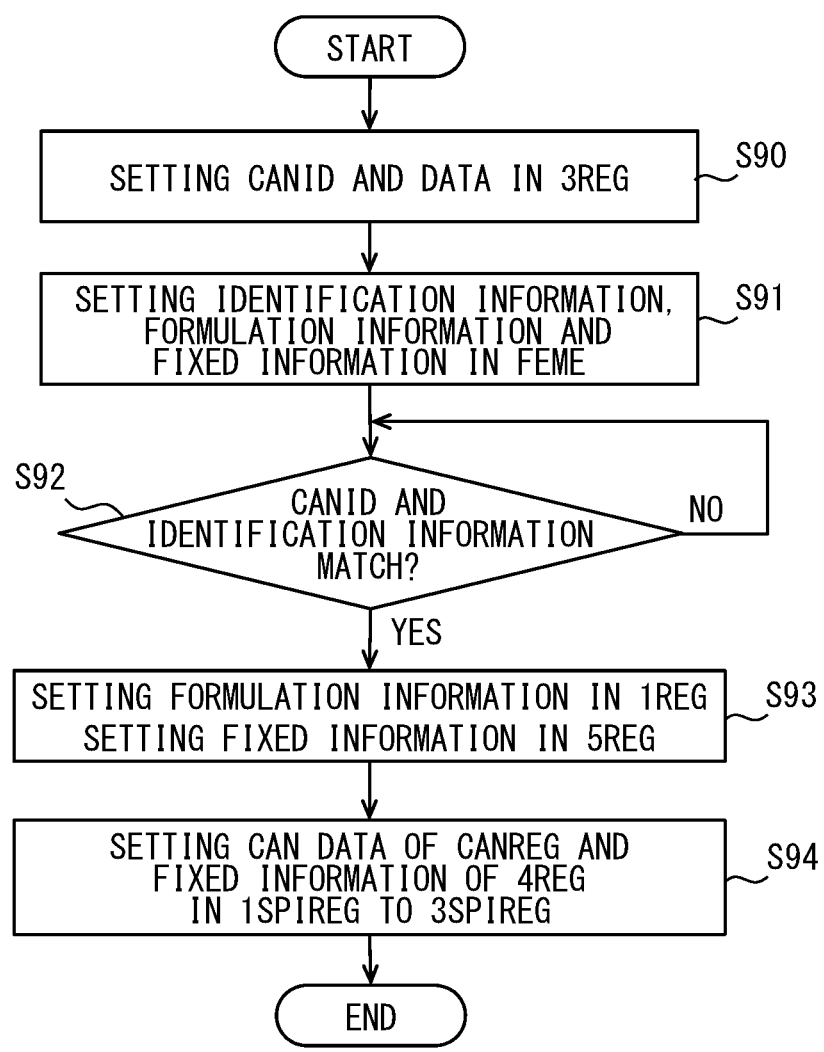
FIG. 22 is a flowchart showing a processing operation related to an SPI frame by a conversion IC.

FIG. 22 shows the process for converting the CAN frame to the SPI frame. S90 is similar to S50. S91 performs S51 and S70. S92 is similar to S52. S93 is similar to S71. S94 is similar to S72.

Figure 23:
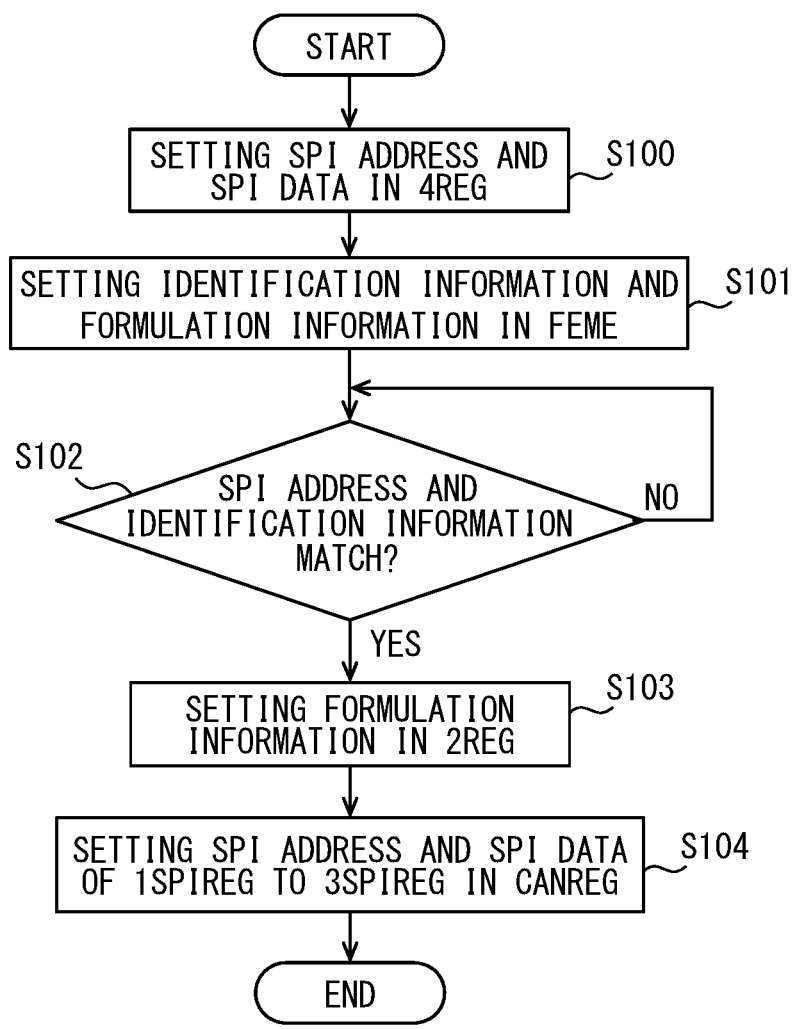
FIG. 23 is a flowchart showing a processing operation related to a CAN frame by the conversion IC.

FIG. 23 shows the process for converting the SPI frame into the CAN frame. S100 is similar to S60. S101 is similar to S61. S102 is similar to S62. S103 is similar to S63. S104 is similar to S82.

The vehicle communication system of the fifth embodiment has the same effects with the third embodiment and the fourth embodiment.

Although the present disclosure has been described in accordance with the embodiments, it is understood that the present disclosure is not limited to such embodiments or structures. The present disclosure also includes various modification examples or variations within the scope of equivalents. In addition, various combinations and forms shown in the present disclosure, as well as other combinations and configurations that include only one element, more, or less, are within the scope and spirit of the present disclosure.

What is claimed is:

1. A vehicle control system comprising:
   an electronic control unit, which is connected between an external electronic control unit and a control target, wherein
   the electronic control unit includes:
      a control circuit that controls a control target; and
      at least one of a first sequence circuit converting a control communication frame into a circuit communication frame or a second sequence circuit converting the circuit communication frame into the control communication frame,
   the control circuit is communicably connected with the at least one of the first sequence circuit or the second sequence circuit,
   the electronic control unit communicates the control communication frame with the external electronic control unit under a first communication protocol, and
   the control circuit communicates the circuit communication frame with the at least one of the first sequence circuit or the second sequence circuit under a second communication protocol that is different from the first communication protocol.

2. The vehicle control system according to claim 1, wherein
   the first sequence circuit converts the control communication frame into the circuit communication frame by extracting an address and data from the control communication frame transmitted from the electronic controller and storing the extracted address and data in the circuit communication frame.

3. The vehicle control system according to claim 1, wherein
   the second sequence circuit converts the circuit communication frame into the control communication frame by extracting an address and data from the circuit communication frame transmitted from the control circuit and storing the extracted address and data in the control communication frame.

4. The vehicle control system according to claim 2, further comprising
   a storage device storing formulation information,
   wherein the formulation information indicates a storage destination of the address and data defined by a communication protocol of a storage destination communication frame in which the address and data will be stored,
   wherein the storage destination communication frame is one of the control communication frame or the circuit communication frame, and
   wherein the first sequence circuit or the second sequence circuit performs the conversion between the control communication frame and the circuit communication frame by storing the address and data according to the formulation information stored in the storage device.

5. The vehicle control system according to claim 4, wherein
   the storage device, in addition to the formulation information, stores fixed information indicating values, which are same in an extraction source communication frame and the storage destination communication frame,
the extraction source communication frame is an extraction source from which the address and data are extracted, and corresponds to one of the control communication frame or the circuit communication frame,
the extracted address and data are stored in the storage destination communication frame, and the first sequence circuit converts the control communication frame into the circuit communication frame by storing the extracted address and data in the circuit communication frame and storing the values indicated by the fixed information in the circuit communication frame.

6. The vehicle control system according to claim 4, wherein
the first sequence circuit converts a portion of the control communication frame into a plurality of the circuit communication frames.

7. The vehicle control system according to claim 4, wherein
the second sequence circuit converts a portion of each of a plurality of the circuit communication frames into the control communication frame.

8. The vehicle control system according to claim 4, wherein
the storage device further stores identification information assigned to a pre-conversion communication frame in association with the formulation information of the pre-conversion communication frame,
the pre-conversion communication frame is one of the control communication frame or the circuit communication frame, and
the first sequence circuit and the second sequence circuit perform the conversion between the control communication frame and the circuit communication frame by storing the address and data according to the formulation information stored in association with the pre-conversion communication frame.

9. The vehicle control system according to claim 1, wherein
the electronic controller, the first sequence circuit, the second sequence circuit, and the control circuit are implemented by a hard logic circuit.

10. A circuit device comprising the vehicle control system according to claim 1.

* * * * *